Apr. 10, 1923.

W. J. PEELLE 1,451,470

MEANS FOR FORMING AND SECURING GASKETS TO JAR COVERS

Filed Oct. 18, 1920 3 sheets-sheet 1

INVENTOR.
WILLIS J. PEELLE

BY

*Lockwood & Lockwood*
ATTORNEYS.

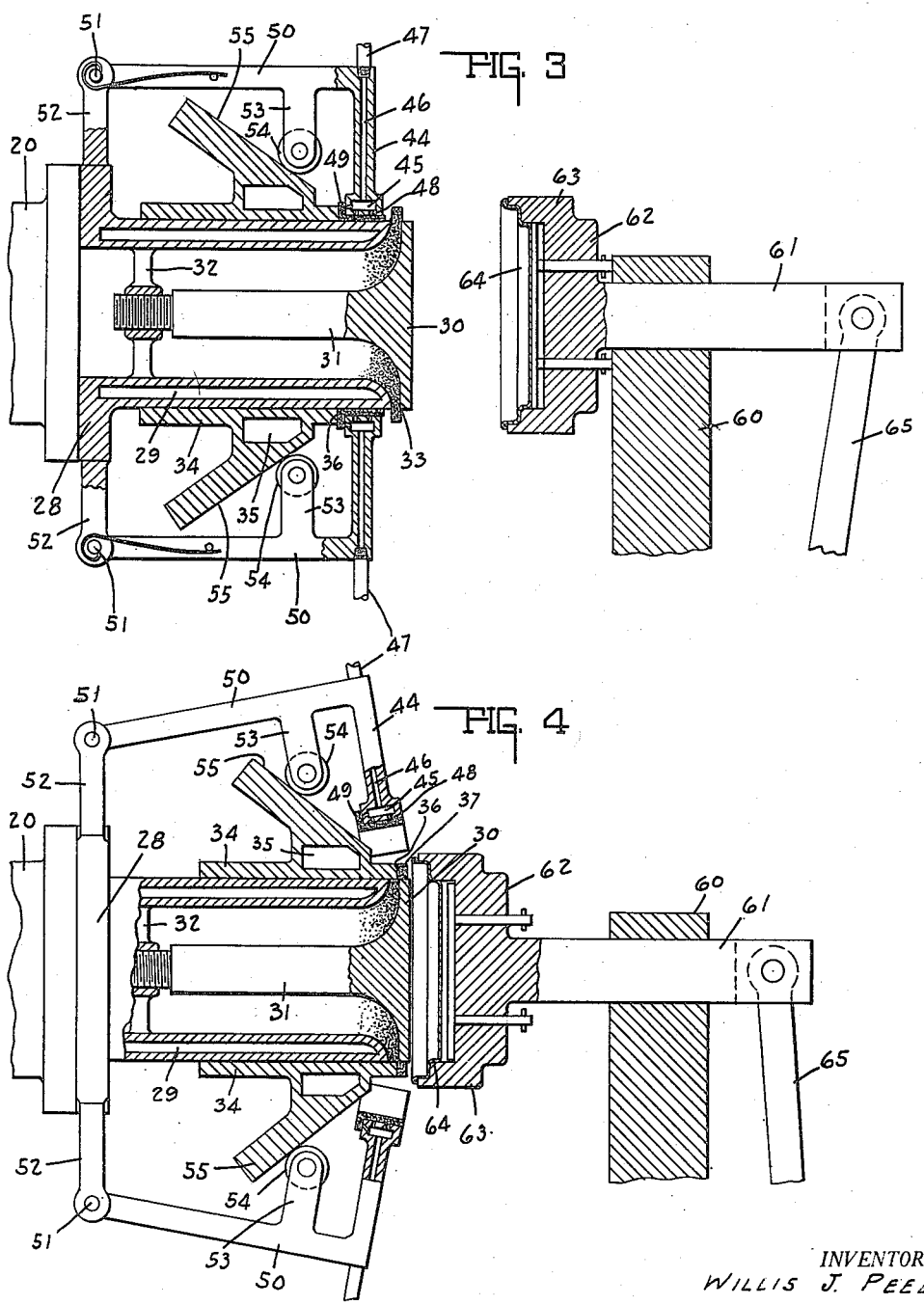

Apr. 10, 1923.
W. J. PEELLE
1,451,470
MEANS FOR FORMING AND SECURING GASKETS TO JAR COVERS
Filed Oct. 18, 1920  3 sheets-sheet 3
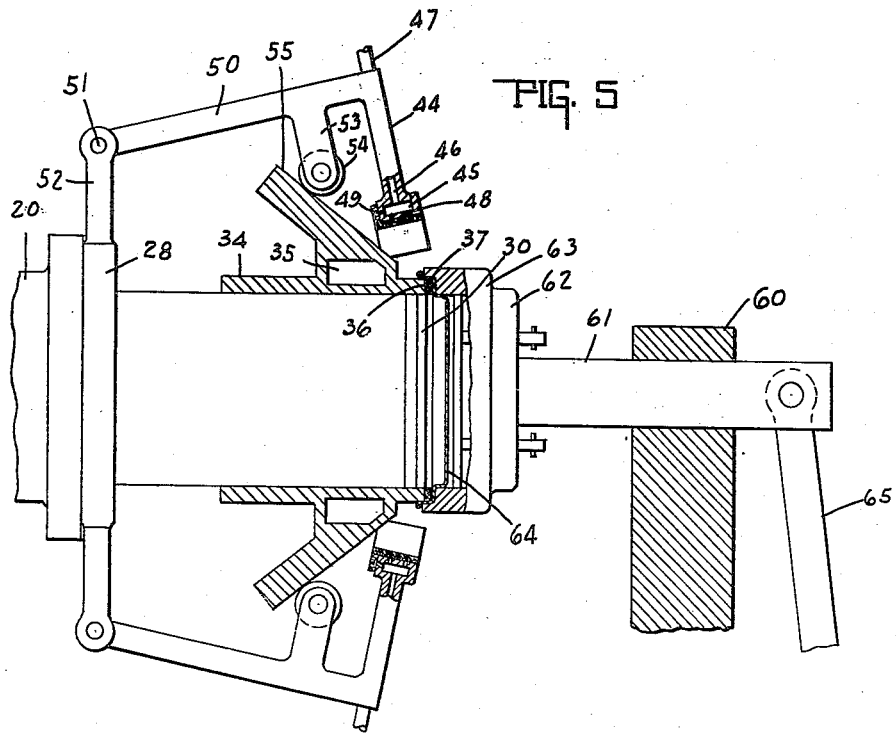
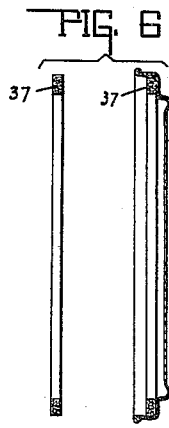
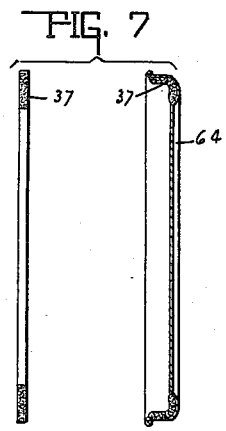
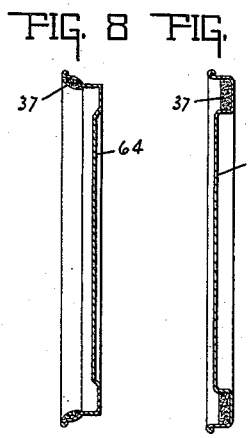
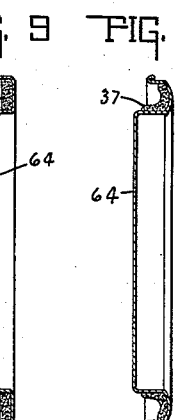
INVENTOR.
WILLIS J. PEELLE
BY
ATTORNEYS.

Patented Apr. 10, 1923.

1,451,470

UNITED STATES PATENT OFFICE.

WILLIS J. PEELLE, OF CHICAGO, ILLINOIS.

MEANS FOR FORMING AND SECURING GASKETS TO JAR COVERS.

Application filed October 18, 1920. Serial No. 417,825.

*To all whom it may concern:*

Be it known that I, WILLIS J. PEELLE, a citizen of the United States, and a resident of Chicago, county of Cook, and State of Illinois, have invented a certain new and useful Means for Forming and Securing Gaskets to Jar Covers; and I do hereby declare that the following is a full, clear, and exact description thereof, reference being had to the accompanying drawings, in which like numerals refer to like parts.

This invention relates to means for forming gaskets from a mass of material and for securing the gasket or sealing means to a metal surface, such as a jar cover.

The chief object of this invention is to provide means for forming gaskets of rubber composition or rubber-like material which is maintained in a plastic condition in the mass, and which is formed into the sealing rings or gaskets, and simultaneously securing the sealing ring or gasket to a metal surface, such as a jar cover or cap.

One feature of the invention consists in the means for maintaining the die and press means in an operative condition.

The full nature of the invention will be understood from the accompanying drawings and the following description and claims.

Figure 1:
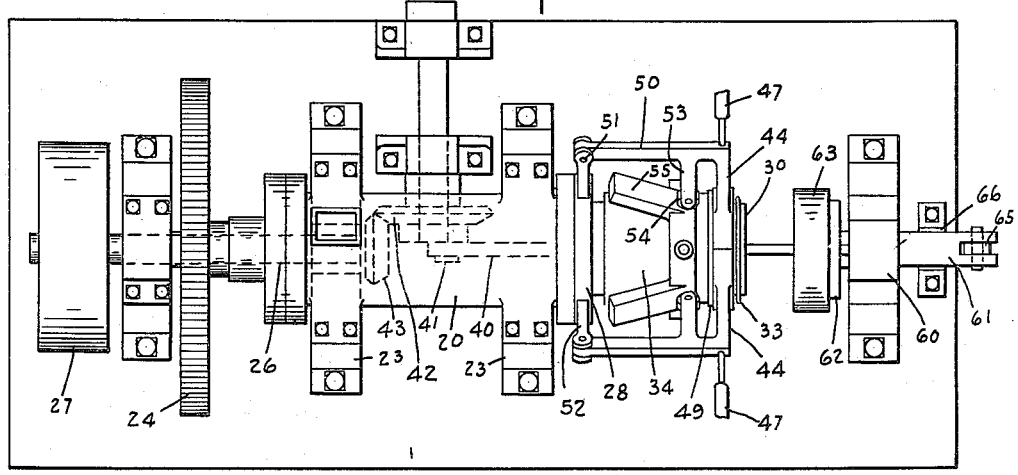
Figure 2:
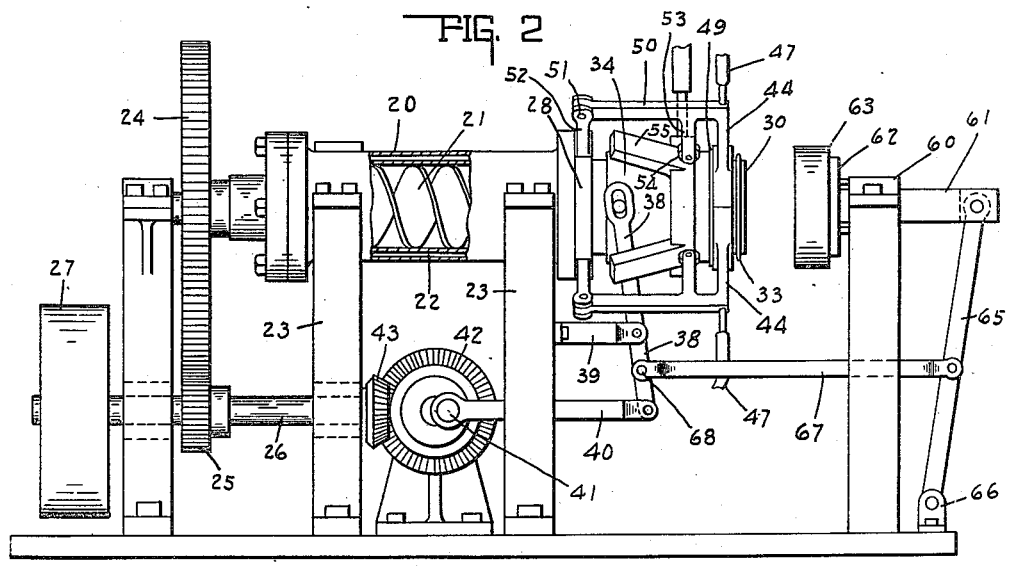

In the drawings Fig. 1 is a plan view of the invention showing the parts in the starting position. Fig. 2 is an elevational view of the parts illustrated in Fig. 1, parts being broken away to show other parts in detail. Fig. 3 is an enlarged central sectional view of the gasket forming means and the gasket securing means in the first position. Fig. 4 is a similar view showing the parts in a later position. Fig. 5 is a similar view showing the parts in the finishing position. Figs. 6 and 7 illustrate modified forms of the sealing ring and the jar cover to which the same is secured. Figs. 8, 9 and 10 illustrate other forms of jar covers to which the sealing rings have been secured.

In the drawings, 20 indicates a chamber or reservoir wherein the mass of the rubber or rubber-like composition is contained, and from which the sealing rings or gaskets are formed. The chamber 20 contains a feed screw 21 which moves the composition or mass forwardly through said chamber. Suitable jacket means 22 adapted to receive a heating media, such as steam, hot water, or the like, maintains said mass of rubber-like or rubber material in a plastic condition and at a proper temperature. The feeding cylinder 20 is stationarily supported upon the brackets or standards 23, and the feed screw 21 therein is rotated by means of a gear 24 driven by a pinion 25 upon the shaft 26, which shaft is driven by a power pulley 27.

Detachably secured to the forward end of the cylinder 20 is a forming die 28, said die also being jacketed at 29. Stationarily secured within the die head 28 is a conical disk head 30 provided with a stem 31 by which the same is secured to the die head 28 by means of the bracket 32. The disk head 30 is positioned in spaced relation with a die head 28 to form an annular opening 33. It will be understood that the width of the opening 33 determines the thickness of the gasket or sealing ring. The head 30, therefore, is provided with a threaded support so that the same may be adjusted longitudinally with respect to the die head 28.

The conical disk head 30 is formed substantially as shown in Fig. 3, so that in combination with the forming die 28 the gasket material will be forced outward laterally and radially, as shown, and somewhat beyond the periphery of the disk 30. The periphery of the disk 30 is preferably in alignment with the periphery of the member 28, as shown.

Concentric with the die head 28 and slidably supported thereon is a shearing cylinder 34 provided with a cooling chamber 35 connected to a suitable source of cooling media. The cylinder 34 is provided with a cutting or shearing face 36, said shearing face being adapted to cooperate with the annular slot 33 and the head 30 to shear, as shown in Fig. 4, the extruded gasket material extending beyond the periphery of the conical disk head 30, as shown in Fig. 3, so as to cut off and form a ring gasket or sealing member 37 from the mass of plastic material. The means for reciprocating the cylinder 34, see Figs. 1 and 2, comprises a bifurcated link member 38 pivotally supported intermediate its ends by the bracket 39 suitably supported by the standard 23. The other end of the link member 38 is pivoted to one end of the connecting rod 40, the other end of which is connected to a crank pin 41 eccentrically positioned upon and driven by a bevel gear 42. The bevel gear 42 is rotatably supported adjacent and is rotated by means of the bevel gear 43 secured upon the shaft 26. It will be understood that the feed screw 21, see Fig. 2, is constantly rotated to force a sufficient amount of the plastic mass through the annular slot 33, and at predetermined times the lever 38 is actuated to reciprocate the shearing cylinder 34 to sever the extruded portion 37 from the mass.

Means is provided which is associated with the shearing cylinder and the die head, whereby the surfaces of the same are suitably prepared such that the plastic rubber or rubber-like mass discharged through the annular slot 33 will not stick to the same. Said means comprises a plurality of sections 44 which sections are adapted to encircle the cylindrical portion of the die between the slot 33 and the non-actuating position of the shearing cylinder. In the present instance each of the arcuate section members 44 is formed hollow to provide a chamber 45 therein which serves as a reservoir, said chamber being supplied with adhesive preventive material, see the channel 46 and the conduit 47. The adhesive preventive material may consist of lubricated water, powdered talc, compressed air, or the like, or may consist of a combination of the same or other suitable means. The present invention will be described as associated with water. The reservoir 45 is provided with a plurality of discharge orifices 48, and preferably associated with the arcuate sections 44 and covering the orifices 48 is a diffusing member, such as a felt portion 49. It will be noted that the felt portion 49 is adapted to moisten simultaneously the uncovered portion of the die head 28 and the forward shearing face 36 of the shearing cylinder 34.

In order that the moistening means hereinbefore described will not interfere with the forward movement of the shearing means in its reciprocation, said moistening means is supported upon a lever member 50, which lever member is pivoted at 51 to a standard portion 52. Integral with the lever 50 is an inwardly extending portion 53 which rotatably supports a follower 54, which constitutes a cam member rollable upon a cam slide 55 formed upon the cylinder 34. With the foregoing construction it will be understood that when the shearing cylinder is moved longitudinally of the cylinder head 28 to shear the gasket 37 from the mass, said inclined cam 55 actuates the follower 54, which in turn swings the arcuate sections outwardly away from said cylinder, as shown in Figs. 4 and 5. Continued forward movement of the shearing cylinder 34 severs the ring 37 from the mass and moves the same towards the end of said cylinder or disk head. When the machine is adapted to form sealing rings independently of securing the same to the cover or other metal surface, the machine is constructed as hereinbefore described, subject, however, to the use of talc as adhesive preventive material.

Positioned adjacent the means hereinbefore described is an upright 60 which slidably supports a stem member 61 provided with a flange 62 to which is detachably secured a die member 63, which die member is adapted to receive and support a jar cover or cap or other similar equivalent means to which it is desired to secure the gasket immediately. Even cans may be suitably supported by said die member to receive a sealing member. In the drawings there is illustrated a cap member 64 which is suitably positioned within the die member 63 and is movable therewith into position against the disk head 30 to receive the sealing member or ring 37. In order that the foregoing means may operate in timed relation with the means previously described, the same is connected thereto and operable thereby as follows. A lever 65 is pivoted at one end of the stem 61 and is pivotally supported at 66. Intermediate its ends there is pivoted to said lever a link member 67, the opposite end of which is pivoted at 68 to the link member 38. Thus, when connected between the pivotal support of the lever 38 and its connection with the connecting rod 40, it will be understood that as the shearing cylinder 34 is moved outwardly towards the disk head, the die head 63, including the cover supported thereby, is moved inwardly towards said disk head so that the parts move relatively, as shown in Figs. 3, 4 and 5 respectively. Fig. 5 it will be seen illustrates the pressing of the newly formed ring into the cap member, and it will be understood that the inherent adhesiveness of the exposed surfaces which contact the cap member assists in the securing of the same to the cover member.

From the foregoing it will be understood that the cylinder 34 not only operates as a shearing member, but operates as a pressing member, and it will be further noted that the heat of the rings maintain the same in a sufficiently plastic condition such that the same will readily accommodate themselves to the metal surface to which the same are to be secured. Figs. 7, 8, 9 and 10 illustrate various types of covers to which rings or gaskets have been secured. To secure rings which are of the diameter illustrated in Fig. 7, it will be understood that the screw 21 is rotated at an increased speed by changing the gear ratio, which causes the screw to extrude from the cylinder 20 to a greater mass of rubber-like material. Thus, rings of various widths, diameters and shapes can be formed and secured to covers and the like by the before mentioned means.

While the invention has been described in considerable detail, many modifications thereof will suggest themselves to those skilled in the art, some of which have been hereinbefore suggested and a few of which have been described in detail. Said modifications are considered to be within the broad purview of this invention.

The invention claimed is:

1. In a machine for forming an applying sealing gaskets and the like, the combination of means for forming a gasket ring including a cylindrical longitudinally reciprocable shearing means for cutting the gasket ring from a mass of gasket material, and means for holding a jar cover and the like in position for the severed gasket ring to be forcibly applied thereto by said shearing means in the shearing movement thereof, whereby the shearing means shears the gasket ring and immediately applies it to the jar cover and the like.

2. In a machine for forming and applying sealing gaskets and the like, the combination of means for containing gasket-forming material, means for extruding said material beyond the periphery of said containing means, a reciprocable shearing means surrounding said containing means for shearing the extruded portion to form a gasket and the like, and means for holding a jar cover and the like in position for the severed gasket to engage immediately after the severing thereof has commenced and for said gasket to be forcibly secured thereto by the further movement of said shearing means.

3. In a machine for forming and applying sealing gaskets and the like, the combination of cylindrical means for containing gasket-forming material with an annular peripheral opening, means for extruding laterally beyond the periphery of said containing means a ring of said material, a reciprocable shearing means surrounding said containing means for shearing the extruded portion to form a gasket ring and the like, and means for holding a jar cover and the like in position for the severed gasket ring to engage immediately after the severing thereof has commenced and for said gasket ring to be forcibly secured thereto by the further movement of said shearing means.

4. In a machine for forming and applying sealing gaskets and the like, the combination of a circular chamber with a bell-shaped outlet, a conical die head of the same diameter as the external diameter of said chamber and adjustably mounted so as to provide a laterally directed annular outlet of the desired size, means for forcing material through said chamber suitable for making gasket rings and the like so that the material will extend annularly and laterally beyond the periphery of said chamber and die head, cylindrical shear means surrounding and reciprocable longitudinally of said chamber and die head for severing the gasket ring and the like, and means for holding a jar cover and the like in position for the severed gasket ring to engage immediately after the severing thereof has commenced and for said gasket ring to be forcibly secured thereto by the further movement of said shearing means.

5. In a machine for forming and applying sealing gaskets and the like, the combination of means for forming a gasket ring including a cylindrical longitudinally reciprocable shearing means for cutting the gasket ring from a body of gasket material, means for holding a jar cover and the like in position for the gasket ring to be applied thereto by said shearing means, and means for moving said means for holding said jar cover and the like towards said shearing means as it applies the gasket ring, whereby the gasket ring will be secured on the jar cover and the like by the combined pressure of the shearing means and the means for moving the jar cover holder.

6. In a machine for forming and applying sealing gaskets and the like, the combination of a circular chamber with a bell-shaped outlet, a conical die head of the same diameter as the external diameter of said chamber and adjustably mounted so as to provide a laterally directed annular outlet of the desired size, means for forcing material through said chamber suitable for making gasket rings and the like so that the material will extend annularly and laterally beyond the periphery of said chamber and die head, cylindrical shear means surrounding and reciprocable longitudinally of said chamber and die head for severing the gasket ring and the like, means for holding a jar cover and the like in position for the gasket ring to be applied thereto as it is severed, and means for moving said means for holding said jar cover and the like towards the means for forming the gasket ring, as it is being applied, whereby the gasket ring will be secured on the jar cover and the like by the combined pressure of the shearing means and the means for moving the jar cover holder.

7. In a machine for forming and applying sealing gaskets and the like, the combination of reservoir means adapted to contain a mass of rubber-like material in a plastic condition, means for extruding a portion of said rubber-like material from said mass, in an annular form, means for severing said extruded portion of the rubber-like material to form a sealing gasket, and means associated with said severing means adapted to support a jar cover and the like in adjuxtaposition to said sealing gasket, whereby said severing means will secure said sealing gasket to said jar cover and the like.

8. In a machine for forming and applying sealing gaskets and the like, the combination of reservoir means adapted to contain a mass of rubber-like material in a plastic condition, means for extruding a portion of said rubber-like material laterally from said mass, in an annular form, means for severing said extruded portion of the rubber-like material to form a sealing gasket, means for supplying an adhesive preventive to the severing means, and means associated with said severing means adapted to support a jar cover and the like in adjuxtaposition to said sealing gasket, whereby said severing means will secure said sealing gasket to said jar cover and the like.

9. In a machine for forming and applying sealing gaskets and the like, the combination of reservoir means adapted to contain a mass of rubber-like material in a plastic condition, means for extruding a portion of said rubber-like material from said mass, in an annular form, means for severing said extruded portion of the rubber-like material to form a sealing gasket, means associated with said severing means adapted to support a jar cover and the like in adjuxtaposition to said sealing gasket, whereby said severing means and said last mentioned means cooperate to secure said sealing gasket to said jar cover and the like, and means for moving towards each other said severing means and said supporting means in timed relation with each other.

10. In a machine for forming and applying sealing gaskets and the like, the combination of reservoir means adapted to contain a mass of rubber-like material in a plastic condition, means for extruding a portion of said rubber-like material from said mass, in an annular form, means for severing said extruded portion of the rubber-like material to form a sealing gasket, means for supplying an adhesive preventive to the severing means, means associated with said severing means adapted to support a jar cover and the like in adjuxtaposition to said sealing gasket, whereby said severing means and said last mentioned means cooperate to secure said sealing gasket to said jar cover and the like, and means for simultaneously operating said severing means, said adhesive preventive supplying means and said supporting means in timed relation with each other.

11. In a machine for forming and applying sealing gaskets and the like, the combination of cylindrical means adapted to contain a mass of rubber-like material in a plastic condition, means for extruding a portion of said rubber-like material from said mass, in an annular form, means for severing said extruded portion of the rubber-like material to form a sealing gasket, and means for causing said gasket to be applied to a jar cover or the like in its position when severed.

12. In a machine for forming and applying sealing gaskets and the like, the combination of means for containing gasket-forming material, means for keeping the gasket-forming material in said containing means heated, means for extruding said material beyond the periphery of said containing means, a reciprocable shearing means surrounding said containing means for shearing the extruded portion to form a gasket and the like, and means for holding a jar cover and the like in position for the severed gasket to engage immediately after the severing thereof has commenced and for said gasket to be forcibly secured thereto by the further movement of said shearing means.

13. In a machine for forming and applying sealing gaskets and the like, the combination of means for containing gasket-forming material, means for extruding said material beyond the periphery of said containing means, means for keeping said shearing means heated, a reciprocable shearing means surrounding said containing means for shearing the extruded portion to form a gasket and the like, and means for holding a jar cover and the like in position for the severed gasket to engage immediately after the severing thereof has commenced and for said gasket to be forcibly secured thereto by the further movement of said shearing means.

14. In a machine for forming and applying sealing gaskets and the like, the combination of cylindrical means for containing gasket-forming material with an annular peripheral opening, means for extruding laterally beyond the periphery of said containing means a ring of said material, a reciprocable shearing means surrounding said containing means for shearing the extruded portion to form a gasket ring and the like, and means for holding a jar cover and the like in position for the severed gasket ring to engage immediately after the severing thereof has commenced and for said gasket ring to be forcibly secured thereto by the further movement of said shearing means, said cylindrical containing means and shearing means being each provided with a jacket-formed chamber for receiving heated fluid for keeping the same heated.

In witness whereof, I have hereunto affixed my signature.

WILLIS J. PEELLE.